A. H. PEYCKE.
BRAKE MECHANISM.
APPLICATION FILED JUNE 10, 1918.
1,335,185.
Patented Mar. 30, 1920.
2 SHEETS—SHEET 1.
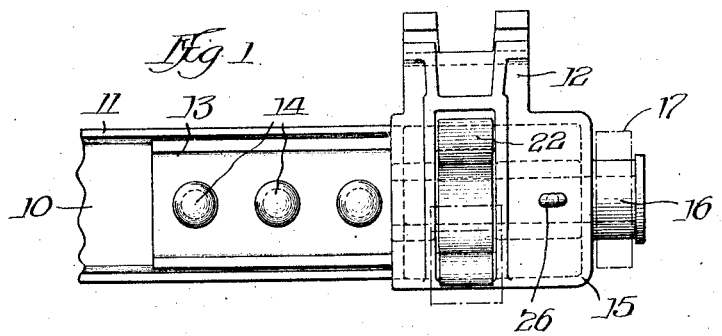
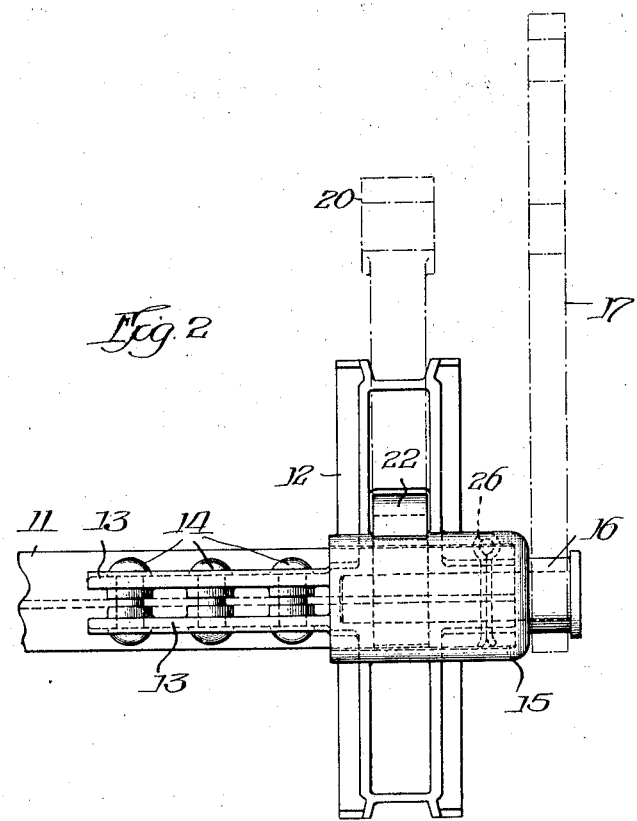

A. H. PEYCKE.
BRAKE MECHANISM.
APPLICATION FILED JUNE 10, 1918.
1,335,185.
Patented Mar. 30, 1920.
2 SHEETS—SHEET 2.
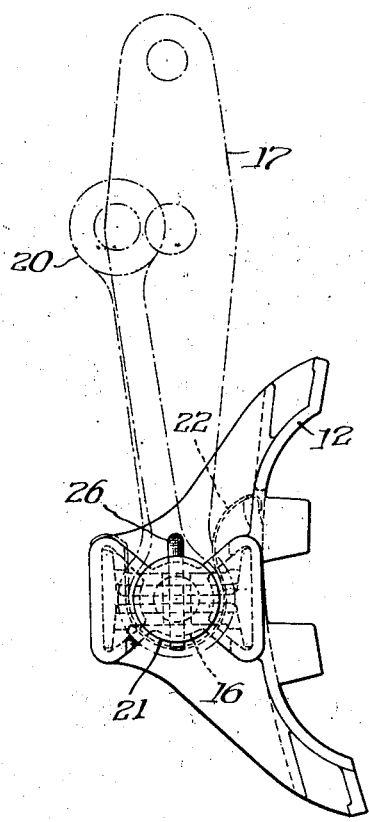
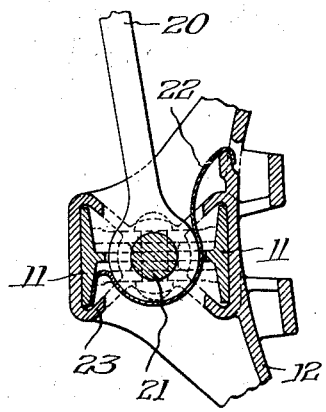
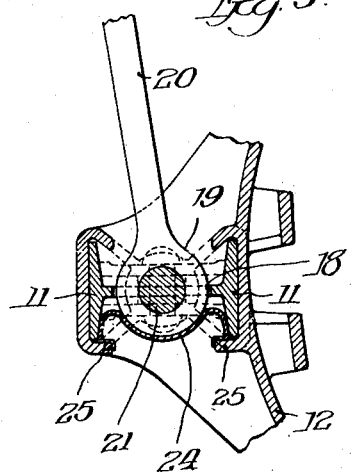
Inventor
Armand H. Peycke

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,335,185.  Specification of Letters Patent.  Patented Mar. 30, 1920.

Application filed June 10, 1918. Serial No. 239,103.

*To all whom it may concern:*

Be it known that I, ARMAND H. PEYCKE, a citizen of the United States, residing at Chicago, in the county of Cook and State of Illinois, have invented certain new and useful Improvements in Brake Mechanisms, of which the following is a specification.

This invention relates to brake mechanisms.

One of the objects of this invention is to simplify and improve brake mechanism arrangements including the placing of brake levers to better advantage with respect to coöperating parts.

Another object is to provide a novel brake beam and head arrangement together with means for supporting same to meet the various requirements for successful commercial operation.

These and other objects are accomplished by means of the arrangement shown by the accompanying sheets of drawings, in which—

Figure 1 is a fragmentary plan view of a brake beam, head, and associated parts embodying my invention;

Fig. 2 is a rear elevation of the arrangement disclosed in Fig. 1;

Fig. 3 is a side elevation of the same arrangement;

Fig. 4 is a sectional view showing the operative arrangement of the brake beam, head and hanger, there being a spring for frictionally holding the hanger with respect to the other parts; and, Fig. 5 is a sectional view similar to the one shown in Fig. 4 and showing a different arrangement of the frictional holding spring.

The various novel features of my invention will be apparent from the following description and drawings and will be particularly pointed out in the appended claims.

Referring to the figures of the drawings, it will be noted that I have provided a brake beam preferably in the form of a rolled I-section having a web 10 and vertical flanges 11. Fitting over each end of the brake beam is a brake head 12 preferably of malleable material having inwardly extending arms 13 which embrace opposite sides of the web 10 to which the arms are secured by means of rivets 14, or other suitable means.

The brake head 12 is provided with a substantially closed end or cap portion 15 capping the end of the brake beam, said portion 15 terminating in a trunnion 16 at the outer side of the brake head for the reception of a brake lever 17. In this connection it will be noted that the brake lever 17 is located outside of the brake head and intermediate the latter, and the side frame (not shown) for simplifying brake rigging and the means for supporting same wherein there are no wheel guards such as in freight car equipments. The web 10 at the outer ends of the brake beam is punched, or otherwise removed, as at 18, for the reception of the eye portion 19 of brake hangers 20, whereby the hanger may be applied centrally with respect to the width of the brake beam. To connect the hanger 20 to the brake head, a pin 21 is extended axially through the trunnion 16 of the brake head and passes through the eye portion of the hanger forming a suitable pivotal connection between the parts in question.

As shown in Fig. 4, a spring 22 embraces, or frictionally engages, the lower eye portion of the hanger 20 and has one of its ends anchored between a brake beam flange 11 and one of the brake head over-hanging portions 23, which hook over the flanges 11 of the brake beam. The other end of the spring 22 is hooked over a wall portion of the brake head. By means of this spring arrangement the brake hanger is frictionally held with respect to the coöperating parts in a manner such that the brake head may adjust and maintain itself in concentricity with the associated wheel.

In Fig. 5 I have shown a spring 24 which embraces the lower eye portion 19 of the hanger 20, the ends of the spring being anchored to overhanging portions 25 of the brake head and which are associated with the brake beam flanges 11.

To prevent the pin 21 from being accidentally withdrawn from its normal position, a cotter pin 26 is extended through registering openings in the brake head and pin 21.

By means of this brake mechanism arrangement a simple and effective combination is produced which is adapted to meet the various operating requirements.

It is my intention to cover all modifications of the invention falling within the spirit and scope of the following claims.

I claim:

1. In brake mechanism, the combination of a brake beam, and a brake head mounted thereon, said brake head having a trunnion at its outer side for a brake operating member.

2. In brake mechanism, the combination of a brake beam, a brake head mounted on the end thereof, said brake head having a trunnion at one side thereof, and a brake lever operatively connected to said trunnion.

3. In brake mechanism, the combination of a brake beam, a brake head mounted thereon, said brake head having a trunnion formed on the outer side thereof, and a brake operating member pivotally connected to said trunnion.

4. In brake mechanism, the combination of a brake beam, a head mounted thereon, a brake hanger, and a separate pin extending through said brake head to form a pivotal connection between the latter and the hanger.

5. In brake mechanism, the combination of a brake beam, a head mounted thereon having a trunnion, a brake hanger, and a member passing within said trunnion and pivotally connecting said brake head and hanger.

6. In brake mechanism, the combination of a brake beam, a head mounted thereon, a brake hanger, a separate pin extending through said brake head to form a pivotal connection between the latter and the hanger, and a spring operatively associated with said brake head and hanger for adjustably frictionally holding the same with respect to each other.

7. In brake mechanism, the combination of a brake beam of I-section, a brake head mounted thereon and having laterally extended arms embracing the web of said beam, and means for securing said arms to the web of said beam.

8. In brake mechanism, the combination of a brake beam of I-section having a web portion removed therefrom, a brake head mounted over said brake beam, and a hanger for said head occupying the space formed by the removal of said web portion.

9. In brake mechanism, the combination of a brake beam of I-section having a portion of its web removed, a brake head mounted over the end of the beam and having arms for embracing the web of said beam whereby the beam and head may be secured to each other, said brake head having a trunnion for an associated brake lever, a brake hanger occupying the space formed by the removal of said web portion, and a member extending through the trunnion forming a pivotal connection between the brake head and hanger.

Signed at Chicago, Illinois, this 28th day of May, 1918.

ARMAND H. PEYCKE.